Nov. 11, 1969   H. LESCURE   3,478,194
ELECTRIC GRILL FOR FOODS
Filed July 27, 1967   3 Sheets-Sheet 3
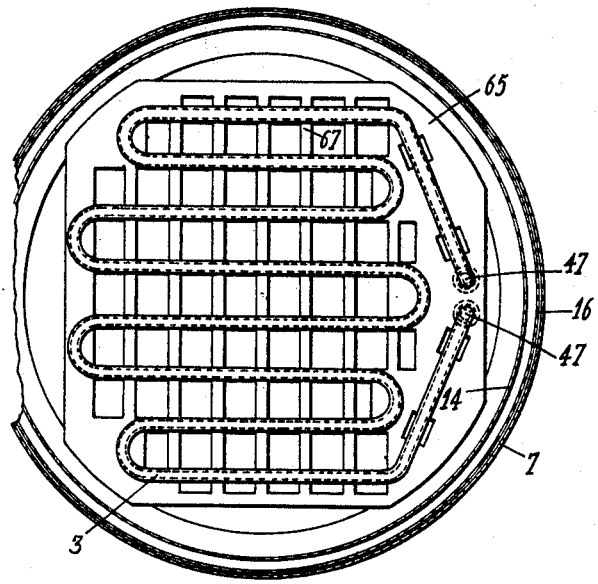
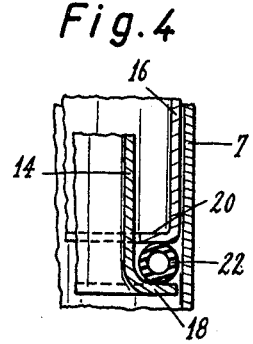
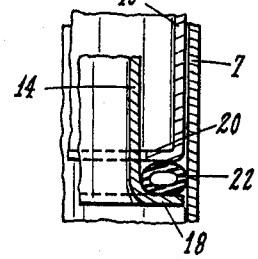
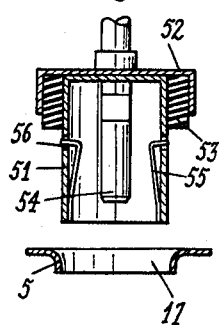
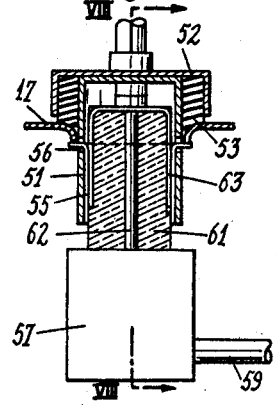
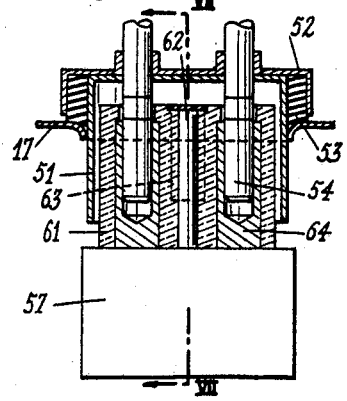
INVENTOR
HENRI LESCURE
BY Young + Thompson
ATTYS.

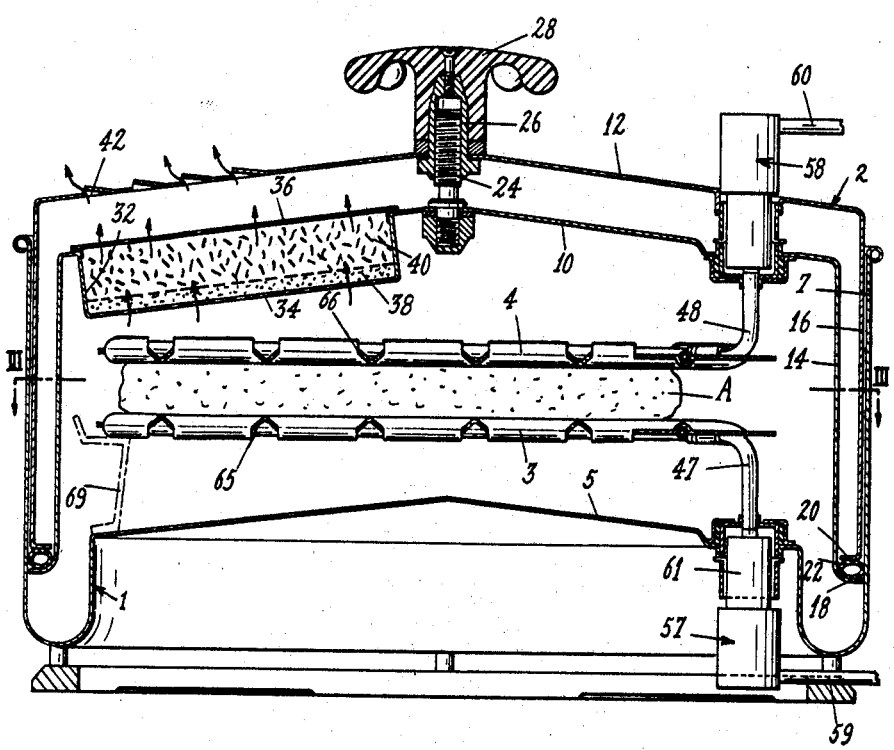

United States Patent Office
3,478,194
Patented Nov. 11, 1969

3,478,194
ELECTRIC GRILL FOR FOODS
Henri Lescure, Selongey, France
Filed July 27, 1967, Ser. No. 656,371
Claims priority, application France, May 18, 1967,
106,740
Int. Cl. F27d *11/00;* A21b *1/22;* H05b *3/06*
U.S. Cl. 219—402                              6 Claims

ABSTRACT OF THE DISCLOSURE

An electric grill for cooking different foods such as meat, fish, bread and the like, characterized in that it comprises two shells which can be mounted one over the other, each shell being adapted to contain an electric heating resistor of the shielded type with spaced arms. The two shells are mounted in interengaged relation, one of said shells being fitted with clamping members for the purpose of adjusting the relative positions of the two shells and consequently of the heating resistors which are carried by said shells.

---

This invention relates to an improved grill of the electrically heated type for the purpose of cooking foods such as meats and fish.

As is already well known, electric grills comprise an electric resistance heater element of the shielded type. Grills of this type attain their working temperature in a very short time. However, the food to be grilled (such as meat, fish, bread and the like) is cooked only on one face at a time and consequently has to be turned over in order to expose the other face to heat, thereby entailing a loss of time. A further disadvantage which holds particularly true in the case of meat or fish lies in the fact that the final cooked product is not sufficiently hot. There are two reasons for this:

(a) When the second face of the food is being grilled, the face which has already been grilled cools since it is exposed only to the surrounding air.

(b) At the moment of turning, the shielded heating resistor which has been cooled by the cooking of the first face has not been restored to a sufficiently high temperature, with the result that the second face is not sufficiently heated. This drawback can in fact be circumvented to a partial extent by utilizing a shielded resistor which has a high power rating. However, in this case there is a danger of overcooking or burning the food. In addition, a high power is required which is not always compatible with the electricity meter which is installed on the mains supply.

Finally, this type of grill gives off pronounced and unpleasant odors.

The present invention is concerned with a portable electric grill which is intended to overcome the disadvantages referred-to above.

A further object of the invention is to reduce the overall size and bulk of the grill when this latter is not in service.

Still another object of this invention is to provide manual control of the pressure with which the resistance heater elements are applied against the food or alternatively to provide adjustment of the spacing of said heater elements when the grill is employed as an oven.

Yet another object of this invention is to permit of very rapid assembly and disassembly of the heating elements in order to facilitate cleaning while effectively protecting the user against any danger of electrocution.

In accordance with the invention, the electric grill is characterized in that it comprises two shells which can be mounted one over the other, each shell being adapted to contain an electric heating resistor of the shielded type with spaced arms.

According to a preferred embodiment of the invention, the two shells are mounted in interengaged relation, one of said shells being fitted with clamping members for the purpose of adjusting the relative positions of the two shells and consequently of the heating resistors which are carried by said shells.

In particular, the upper shell can be mounted inside the lower shell, each shell being given a cylindrical shape and having an approximately U-shaped cross-section.

The upper shell advantageously comprises two coaxial casings which are separated by a resilient seal fitted in an annular channel provided between said two casings on the outside of the shell, said shell being additionally provided with clamping members for coupling the two casings and bringing them together so as to flatten the annular seal by compression, the upper shell being thus positionally locked at a predetermined height inside the lower shell.

Means are preferably provided for the purpose of closing the two shells in a substantially leak-tight manner and for the purpose of mounting on the upper shell a deodorizing filter constituted by a layer of a fat-absorbent product in powdered form on which is placed a layer of activated charcoal for the purpose of absorbing the unpleasant-smelling vapors proper.

In accordance with a further improvement of the present invention, the terminal arms of at least one of the heating resistors terminate in a socket-connector which is detachably mounted in a bore formed in the wall of the corresponding shell. Preferably, said socket-connector contains an internal connector-pin for the engagement thereon of a plug-connector which is also detachably mounted; said socket-connector comprises locking members which are actuated by said plug-connector, said locking members being intended to prevent the socket-connector from being withdrawn together with the heater element which is carried by said socket-connector as long as the plug-connector remains in position.

Further characteristic features of the invention will be brought out by the description which now follows.

One preferred form of execution of the invention is shown in the accompanying drawings which are given solely by way of example and not in any limiting sense, and in which:

FIG. 2 is a view in axial cross-section showing the grill in the service position, the two shells being engaged one inside the other.

FIG. 3 is a view on a smaller scale and in cross-section taken along the line III—III of FIG. 2.

FIGS. 4 and 5 are partial cross-sections on a larger scale showing respectively in the rest position and in the service position the system which is employed for tightening the seal of the upper shell.

FIG. 6 is a view in axial cross-section and on a large scale showing the connection members of the electric resistor or heater element in the disassembled position.

FIG. 7 is a view in cross-section taken along the line VII—VII of FIG. 8 and showing the connection members which are assumed to be in the assembled position.

FIG. 8 is the corresponding cross-section taken along the line VIII—VIII of FIG. 7.

Figure 1:
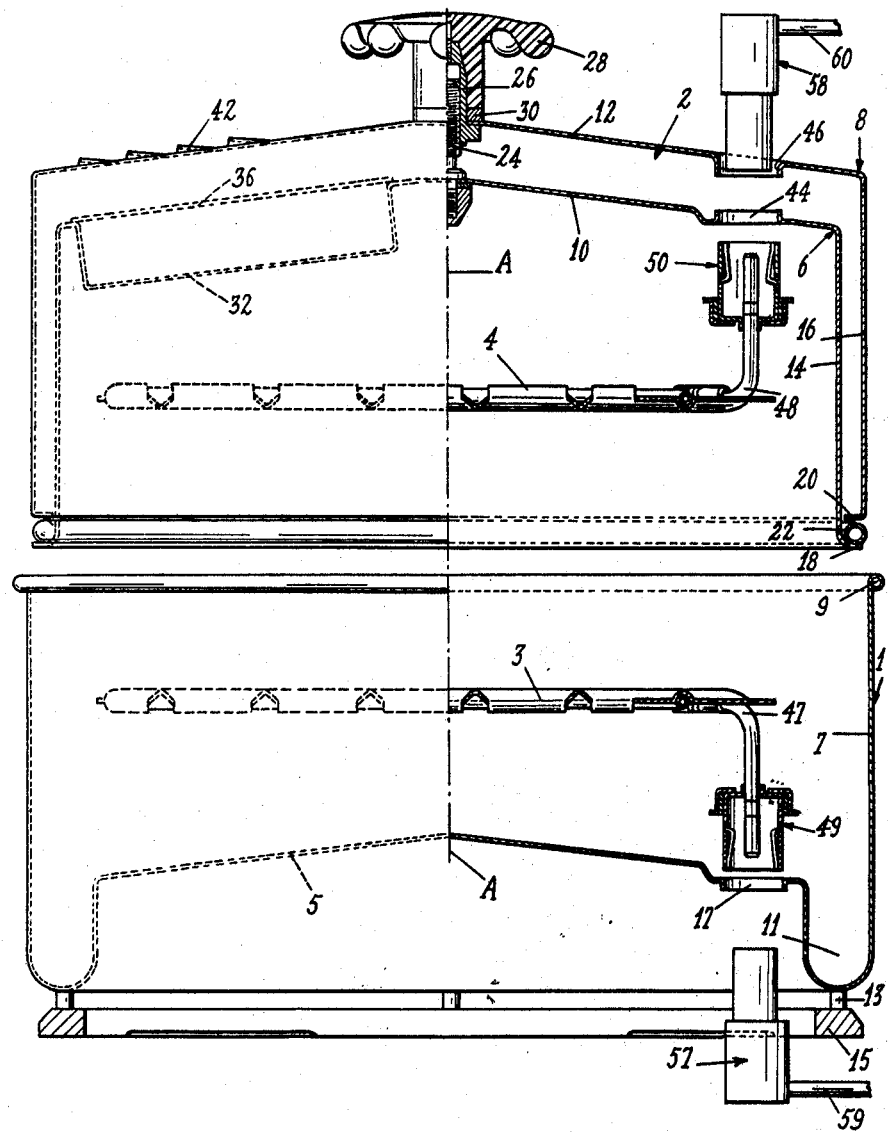
FIG. 1 is a view in elevation and in half-axial cross-section showing the lower shell and upper shell in a separated position, the heater elements having been removed.

Referring now to FIG. 1 of the accompanying drawings, it is apparent that the grill for cooking or broiling foods comprises a lower shell 1 and an upper shell 2 each containing a resistance-type heater element 3 or 4 respectively which is removably mounted in the shell.

The shells 1 and 2 have a cylindrical outer surface, the internal diameter of the shell 1 being slightly greater than the external diameter of the shell 2 in order to permit the frictionless engagement of this latter within the shell 1 as a result of a movement of displacement along the common axis A—A of the shells.

The shell 1 comprises a raised conical end-wall 5 which is joined by annular trough 11 to the cylindrical wall 7 which terminates in a rolled-down edge 9 at right angle to the axis A—A. The shell 1 is supported on feet 13 which are located in spaced relation underneath the trough 11 and integral with an annular member 15 of heat-insulating material.

The convex end-wall 5 is provided with a bore 17 which, as will become apparent hereinafter, permits the removable mounting of the heater element 3.

The vessel which is constituted by the shell 1 can advantageously be formed by die-stamping a metallic sheet which may, for example, be of aluminium or stainless steel.

The upper shell 2 in turn comprises two coaxial casings, namely an inner casing 6 and an outer casing 8 which are adapted to engage one inside the other. Said casings have a substantially U-shaped cross-section and are preferably formed by die-stamping.

The casings 6 and 8 each comprise domical end-walls 10, 12 and parallel cylindrical side walls 14, 16 respectively. Said side walls terminate in annular flanges 18, 20 which are located in oppositely facing relation. There is formed between said flanges a channel in which is fitted an O-ring seal 22 formed, for example, of silicone rubber or like material which affords high heat resistance.

The casings 6 and 8 comprise clamping members which serve to join said casings together while providing a means of controlling their relative displacement. The members referred-to consist of a threaded rod 24 which is secured to the summit of the domical end-wall 10. The threaded rod 24 is fitted with a nut 26 which is rotatably mounted on the dome 12 and secured to a control knob 28. A friction ring 30 permits of rotational motion of the control knob 28 with slight sliding friction against the casing 8.

The domical end-wall 10 shown in FIG. 2, is die-stamped so as to form a chamber 32 having a perforated base 34 and fitted with a cover 36 which is also perforated and detachable. Said chamber 32 is intended to be filled with absorbent material so as to constitute a deodorizing filter. In particular, the chamber 32 is advantageously packed with a bottom layer 38 of a powdered refractory material (such as, for example, calcined fine grained clay) which is intended to absorb the fat-laden vapors and to isolate the upper layer 40 which is primarily intended to absorb unpleasant odors. The layer 40 preferably consists of activated charcoal.

The domical end-wall 12 is in turn pierced by vents 42 for the purpose of evacuating the vapor and hot gases. Finally, the domical end-walls 10 and 12 are provided with oppositely facing bores 44, 46 for the purpose of mounting the heating element as will be explained hereunder.

The elbowed terminal arms 47, 48 of the heater elements 3 and 4 which are of the shielded type terminate in socket-connectors 49, 50 which can be removably mounted by engagement respectively in the bores 17 and 44, 46.

The socket-connectors 49, 50 which are of identical structure each comprise a terminal-protector 51 (as shown in FIGS. 6 to 8), said protector being covered by an end-cap 52 with interposition of a projecting annular seal 53. Each terminal-protector 51 contains two connector-pins 54 which form extensions of the arms 47 or 48.

There are mounted inside the socket-connectors 49, 50 locking springs 55 constituted by flexible rods having elbowed heads mounted opposite to bores 56 formed in the wall of the terminal-protector 51. In the rest position, the ends of the rods 55 remain withdrawn inside the terminal-protector 51.

Plug-connectors 57, 58 are associated with the socket-connectors 49, 50 and supplied with current by means of flexible leads 59, 60. The plug-connectors 57, 58 each comprise a plug such as the plug 61 (as shown in FIGS. 7 and 8) which is made of insulating material and attached by means of a rod 62, said rod being secured to a flange 63 which serves as a ground connection.

There are mounted in the plug 61 two resilient-clamping sockets 64 of electrically conducting material which are supplied with current by the flexible leads 59 or 60.

In the preferred embodiment under consideration, the shielded heating resistors 3 and 4 are designed in a known manner in a snake-like coil configuration. But in addition, the arms of the coil are set respectively in perforated plates 65, 66 which form a series of cross-strips such as the strip 67 shown in FIG. 3, thereby endowing the assembly with a high degree of rigidity and increasing the heating area while reducing the power rating. The resistors 3, 4 which are in service are perpendicular to the axis A—A.

The practical utilization of the grill is as follows. When the shells 1 and 2 are drawn apart, the socket-connectors 49, 50 are placed inside the bores 17 and 44, 46, thereby positioning the resistors 3 and 4 within the shells 1 and 2.

When the operating knob 28 and the nut 26 are unscrewed, the domical end walls 10 and 12 are displaced to a maximum distance from each other, with the result that the seal 22 is not tightened between the flanges 18 and 20 and does not project laterally with respect to the wall 16 of the casing 8.

When a piece of food A to be grilled has been placed on the heater element 3, the shell 2 is then engaged inside the shell 1 to the desired height and locked in position by tightening the knob 28, as shown in FIG. 2. In fact, this movement causes the closure of the casings 6, 8 and therefore of the flanges 18, 20 which accordingly compress the seal 22. The seal then projects (as shown in FIG. 5) relatively to the wall 16 and is thus applied against the internal surface of the wall 7 which limits its radial expansion, with the result that the shells 1, 2 are brought into contact with strong friction and coupled together.

The adjustment of the extent of interengagement of the shells is governed by the nature of the piece of food A to be cooked. In the case of grilled steak, for example, the heater elements 3 and 4 are preferably brought into contact with the food. On the contrary, in the case of a roast, the heater element 4 is maintained at a predetermined distance from the piece of food A which is thus subjected to local cooking by the heater element 3 and general cooking by the element 4.

If so desired, a removable grid may be provided in this case for the purpose of separating the food product A from the heater element 3.

In both cases, the seal 22 provides both a clamping action in order to hold the shells in position and leak-tightness with respect to gases and smokes which are given off inside the sealed enclosure which is thus formed.

In order to effect the supply of current to the resistors 3 and 4, the plugs 61 of the plug-connectors 57, 58 are inserted within the terminal-protectors 51 in such a manner that the connector-pins 54 are permitted to penetrate into the sockets 64.

During the engagement, the plugs 61 thrust back the resilient rods 55. The heads of said rods are thus caused to project outwards through the bores 56. This makes it possible to lock the socket-connectors 49, 50 inside their recesses and prevents the user from removing these socket-connectors as long as the plug-connectors 57, 58 remain in position, which is an essential requirement for the user's personal safety. It will be noted that, once the socket-connectors 49, 50 are placed in position, the projecting annular seals 53 are flattened by compression (FIGS. 7 and 8) against the edges of the bores 17 and 44, which is favorable to leak-tightness.

During operation of the electric grill, the vapors and smokes pass through the pre-filter 38 which retains the fatty particles while protecting the filter 40 against the heat which is generated. Said filter retains the smokes and odors, with the result that the hot gases which pass out through the vents 42 are totally odorless. Should it be desired to replace the filter material, it is merely necessary to unscrew the nut 26 completely in order to uncouple the casings 10 and 12, thereby providing access to the cover 36 of the chamber 32.

The grill according to the invention is therefore of simple structural design and easy to manufacture. A tight sealing can readily be ensured and overall dimensions of the apparatus are reduced to a minimum.

Furthermore, complete safety is ensured from the electrical point of view.

It is wholly apparent that the invention is not limited to the embodiment herein described and that a number of alternative forms of execution can be contemplated. Thus, a cock providing a run-off for the meat juices and fitted with a fluid-tight valve could be added to the annular trough 11 which normally collects the juice and prevents it from burning by virtue of the fact that said trough is located at a relatively remote distance from the heater element 3.

In addition, a support such as the support 69 which is shown in FIG. 2 could be provided on each shell for the purpose of holding the heater elements 3 and 4 in position but in a removable manner, especially at the end remote from the arms 47, 48 in order to prevent any deflection of said arms. Similarly, a thermostat or thermal safety system could be provided for the electric current supply. It is also readily apparent that spiral heating resistors could be employed.

What I claim is:

1. An electric grill comprising a pair of superposed shells each containing an electric heating element, means for connecting each heating element to a source of electric current, one shell being engageable within the other, and clamping means engageable between said shells in any of a plurality of adjusted positions of said shells relative to each other thereby to maintain said one shell disposed within said other shell to any of a plurality of depths so as to provide a closed cooking space within said grill that is adjustable to any of a plurality of volumes, said clamping means comprising an annular resilient seal carried by one of said shells and disposed between said shells, and means manipulable from outside said shells selectively to press said resilient seal into clamping relationship with the other of said shells and to release said resilient seal from clamping relationship with the other of said shells.

2. An electric grill as claimed in claim 1, said shells having telescoping closely spaced side walls that are parallel to each other in the direction of movement of said one shell into and out of said other shell.

3. An electric grill as claimed in claim 2, said pressing means comprising spaced inner and outer casings constituting said one shell by which said seal is carried, said seal being disposed between said spaced side walls and between opposed edge portions of said casings, and means for moving said casings axially relative to each other so as to move said edge portions toward and away from each other to compress and release said annular resilient seal.

4. An electric grill as claimed in claim 3, said moving means comprising a screw-threaded member on one said casing screw-threadedly engageable with another screw-threaded member on the other of said casings, and means to rotate one of said screw-threaded members relative to the other to move said casings axially relative to each other.

5. An electric grill as claimed in claim 3, and means carried by said inner casing defining a chamber, a perforated cover for said chamber, a substance in said chamber for removing foreign substances from vapor pressing through the chamber, and vents through said outer casing for the evacuation of vapor.

6. An electric grill comprising a pair of superposed shells and an electric heating element in each shell, at least one of said heating elements having an electric socket removably mounted in its associated shell for the reception of an electric plug, and locking means carried by said socket and responsive to the insertion of an electric plug in said socket to lock said socket to said shell, said locking means comprising at least one locking member disposed within said socket in the path of a said plug and movable by a said plug to a position in which said member is lockingly engageable with said associated shell, said socket having a shoulder thereon that engages on one side of a portion of said associated shell, said member when moved by a said plug being engageable with the other side of said portion of said associated shell.

References Cited

UNITED STATES PATENTS

| | | | |
|---|---|---|---|
| 1,894,875 | 1/1933 | Knapp | 219—402 |
| 3,154,004 | 10/1964 | Huck | 219—347 |
| 3,119,001 | 1/1964 | Andrews | 219—413 |
| 3,245,337 | 4/1966 | White et al. | 219—524 X |
| 3,350,542 | 10/1967 | Getman | 219—412 |

BERNARD A. GILHEANY, Primary Examiner

H. B. GILSON, Assistant Examiner

U.S. Cl. X.R.

219—413, 524